(12) United States Patent
Green et al.

(10) Patent No.: US 8,086,337 B1
(45) Date of Patent: Dec. 27, 2011

(54) COMPUTERIZED SYSTEM AND METHOD FOR GENERATING A DELIVERY BILL OF MATERIALS

(75) Inventors: Linda Green, Alexandria, AL (US); Geoff Duncan, Vestavia, AL (US)

(73) Assignee: Honda Motor Co., Ltd., Tokyo (JP)

( * ) Notice: Subject to any disclaimer, the term of this patent is extended or adjusted under 35 U.S.C. 154(b) by 333 days.

(21) Appl. No.: 12/545,565

(22) Filed: Aug. 21, 2009

(51) Int. Cl.
*G06Q 10/00* (2006.01)
*A01K 5/02* (2006.01)
*G06F 17/50* (2006.01)
*G06F 19/00* (2006.01)

(52) U.S. Cl. ......... 700/107; 700/99; 700/104; 705/7.11; 705/7.22; 705/7.23; 705/28; 705/29

(58) Field of Classification Search .................. 700/99, 700/104, 107; 705/7.11, 7.22, 7.23, 28, 29
See application file for complete search history.

(56) References Cited

U.S. PATENT DOCUMENTS

| | | | | |
|---|---|---|---|---|
| 4,827,423 A * | 5/1989 | Beasley et al. | ................. | 700/96 |
| 4,875,162 A | 10/1989 | Ferriter et al. | | |
| 5,971,585 A * | 10/1999 | Dangat et al. | ................. | 700/102 |
| 6,041,268 A | 3/2000 | Jin | | |
| 6,268,853 B1 * | 7/2001 | Hoskins et al. | ................. | 700/83 |
| 6,560,508 B1 * | 5/2003 | Radican | ........................ | 700/214 |
| 6,819,967 B2 * | 11/2004 | Ballas et al. | ................. | 700/107 |
| 6,823,226 B2 * | 11/2004 | Clemens et al. | ................ | 700/99 |
| 6,850,904 B2 * | 2/2005 | Ballas et al. | ..................... | 705/29 |
| 6,937,992 B1 | 8/2005 | Benda et al. | | |
| 7,043,324 B2 | 5/2006 | Woehler | | |
| 7,162,318 B1 * | 1/2007 | Brearley et al. | ................. | 700/97 |
| 7,209,869 B1 * | 4/2007 | Kroger et al. | ..................... | 703/1 |
| 7,295,896 B2 * | 11/2007 | Norbeck | ........................ | 700/276 |
| 7,395,228 B2 | 7/2008 | Seaman et al. | | |
| 7,471,990 B2 * | 12/2008 | Hotta et al. | .................... | 700/107 |
| 7,526,441 B2 | 4/2009 | Nakajima et al. | | |
| 2002/0002516 A1 | 1/2002 | Sakayori et al. | | |
| 2002/0165805 A1 * | 11/2002 | Varga et al. | ..................... | 705/28 |
| 2003/0009410 A1 * | 1/2003 | Ramankutty et al. | ........... | 705/37 |
| 2003/0126023 A1 * | 7/2003 | Crampton et al. | ............... | 705/22 |
| 2003/0208418 A1 * | 11/2003 | Caputo et al. | .................... | 705/28 |
| 2003/0220853 A1 | 11/2003 | Back et al. | | |
| 2004/0098151 A1 * | 5/2004 | Carlucci et al. | ................. | 700/95 |
| 2005/0131779 A1 * | 6/2005 | Kitamura et al. | ............... | 705/29 |
| 2006/0190364 A1 | 8/2006 | Bizovi et al. | | |

(Continued)

FOREIGN PATENT DOCUMENTS

CN 1734480 A 2/2006

(Continued)

*Primary Examiner* — Ronald Hartman, Jr.
(74) *Attorney, Agent, or Firm* — Standley Law Group LLP

(57) ABSTRACT

A computerized system and method for generating a delivery bill of materials (BOM) for use at a production facility. Input includes parts data identifying the parts used in the production process, delivery/process location data identifying areas on the production line where parts are delivered, and packaging data related to containers in which parts are delivered. Each delivery BOM has a code for an associated product and data that defines a relationship between a trailer loaded with case packs of parts, a delivery process code, and a tugger for delivering the packs to line locations. Each trailer holds multiple packs assigned to different delivery process codes. The delivery process code ties the case packs on the trailer to the tuggers and is associated with one or more assembly processes. Each delivery process code is assigned to an associate that coordinates case pack and tugger staging according to supported production processes.

20 Claims, 13 Drawing Sheets

U.S. PATENT DOCUMENTS

| | | |
|---|---|---|
| 2006/0212371 A1 | 9/2006 | Cheng |
| 2006/0235771 A1 | 10/2006 | Oberoi |
| 2007/0219929 A1* | 9/2007 | Steinbach .................. 705/80 |
| 2008/0091291 A1* | 4/2008 | Roy et al. .................. 700/116 |
| 2008/0091575 A1 | 4/2008 | Naghshineh et al. |
| 2008/0091942 A1 | 4/2008 | Glatfelter et al. |
| 2008/0114660 A1* | 5/2008 | Berkooz et al. ............. 705/23 |
| 2008/0120129 A1* | 5/2008 | Seubert et al. .............. 705/1 |

FOREIGN PATENT DOCUMENTS

| | | |
|---|---|---|
| JP | 2009-80536 A | 4/2009 |
| TW | 533362 B | 5/2003 |

\* cited by examiner

Process Development Maintenance

Query Delivery Codes
(*) – Required

- 210 — Plan Code: [CBA 2109250XX1 ▽]  * [1]
- 212 — Department: [AF ▽]  * [FRAME LINE 2]
- 214 — Trailer Code: [ ▽]  [ ]
- 216 — Delv Process: [ ▽]  [ ]
- 218 — Tugger Number: [ ▽]

[Query]

Insert Delivery Codes
The New Delivery code will be created for the above selected Plan and Department

| Trailer Code | Delv Process | Tugger Number | Tugger Message — 220 |
|---|---|---|---|
| [2S03 ▽] | [AS33 ▽] | [03 ▽] | [ ] [Insert] |

FIG–10

Delivery Management System

Case Code Maintenance

Query Case Codes      (*) – Required

- Plan Code: CBA 2109250XX1 ▽   * 1
- Department: AF ▽   * FRAME LINE 2
- Model Code: XX1 ▽   *
- (Trlr Cd, Proc Cd, Pull No)
- Delivery: 2S03, AS33, 33 ▽ *  ← 232

Search Case Codes:

- S07 ▽ ← 230
- Trailer Code: 2S03   2S03
- Delivery Process: AS33   AS33
- Tugger Number: 33   33

[ Query ]

← 234

Create New Case Codes

[ Enter Code ]   [ Submit ]

Process Maintenance

Query Process Data    (*) – Required

Plan Code: CBA 2109250XX1 ▽ *Dept: AF ▽ *Model: XX1 ▽ *Type: MP ▽ DeliveryMode: PAD ▽

Search Part Numbers

06596   Search   Part No: 11223344AABB   Case Code: S07   ▽ — 240

Search Help

Process Loc: ▽   Zone: ▽   Standard Date: 07/15/2009 ▽   MassInsert   Query

Insert Process Data   (*) – Required

Update Process Data   Update   Delete

| Sel | Part No | Zone | Proc Loc | Qty | Delv Mode | Body Loc | Case Code | Quad Level |
|---|---|---|---|---|---|---|---|---|
| ☐ | Check/Uncheck All | | | | | | | |
| ☐ ⓘ | 1234567891011112B | AF24 ▽ | 0052 ▽ | 1 | PAD ▽ | 999 | NA ▽ | QUAD |

Update   Delete

COMPUTERIZED SYSTEM AND METHOD FOR GENERATING A DELIVERY BILL OF MATERIALS

CROSS-REFERENCES TO RELATED APPLICATIONS

None.

FIELD OF THE INVENTION

The present invention is directed to computerized systems and methods for generating a bill of materials. More particularly, the present invention is directed to a computerized system and method for generating a delivery bill of materials for use in delivering parts to a production line.

BACKGROUND OF THE INVENTION

Bills of materials are used in manufacturing for a variety of activities. A bill of material (BOM) may define the parts to be used in a particular product (engineering bill of materials), the parts to be ordered from suppliers to build a particular product (purchasing bill of materials), the parts to be assembled or installed to build a particular product (manufacturing bill of materials), or the parts that are needed to maintain a particular product (service bill of materials). The different types of BOMs that a business uses depend in part on the business's needs, the types of products that the business manufactures, and the manufacturing processes that the business uses. For example, in automotive manufacturing, the BOM typically lists the parts, supplies, and materials that are needed to manufacture a particular model of automobile. Different BOMs are developed and maintained for the different models that are manufactured.

One type of BOM that some automotive manufacturers use is a delivery BOM. In addition to specifying the parts, supplies, and materials that are needed to assemble a particular model of an automobile, the BOM has delivery data that specifies how and where the parts are to be delivered from a materials service location to a particular location on the production or assembly line. The delivery data may specify details regarding the organization of containers for delivering the parts as well as a specific line location where the part containers should be delivered.

The delivery BOM may need to be updated frequently to reflect various changes to the data that may occur. For example, if the manufacturer changes suppliers for a particular part, the delivery BOM must be updated to reflect the change in part data and possibly the related delivery data. Parts may be redesigned from time-to-time which may also require updates to the delivery BOM to distinguish between the new part and old part. Related delivery data may also need to be changed. Finally, changes to assembly processes may require changes to delivery data.

Ensuring that the data in a delivery BOM is accurate and reflects any changes that have occurred can be a time consuming and labor intensive process. Parts data and delivery data may be maintained in different databases. Some manufacturers generate delivery BOMs by accessing data from multiple data sources, adding it to a spreadsheet, and then manually reviewing and updating the spreadsheet to reflect changes that may be present in the data sources. This approach is problematic for a variety of reasons. First, it is time intensive and requires associate time to manually manipulate files. Second, the manual movement of data means that mistakes are easy to make but difficult to detect. Third, it is almost impossible to verify all production line locations have appropriate delivery data. The labor intensive approach simply makes it difficult to maintain accurate data.

There is a need for a computerized system and method for generating a delivery BOM that solves the problems identified above. There is a need for a computerized system and method for generating a delivery BOM that can accept parts data, delivery data, and other data from different sources and combine the parts data, delivery data, and other data as needed into a single delivery BOM. There is a need for a computerized system and method for generating a delivery BOM that reduces the labor involved in generating a delivery BOM and that has accurate information. There is a need for a computerized system and method that supports generation and maintenance of delivery BOMs for different products and models that are manufactured.

SUMMARY OF THE INVENTION

The present invention is a computerized system and method for generating a delivery BOM. Data from various computer systems and databases is received at a computer. A computer user is prompted for information that combines the data from the different sources to generate a delivery BOM and verify its accuracy. In an example embodiment, the data sources include a parts data source identifying the parts that used are in the production process, delivery/process location data identifying areas on the production line where parts are delivered for use in production, and packaging data that provides details regarding the containers and packages in which parts are delivered from suppliers to a consolidation center or warehouse. Containers of parts from suppliers are received at a consolidation center or materials service center, then organized into case packs. The parts, delivery, and packaging data is used to develop a delivery BOM that facilitates delivery of case pack parts from a trailer at a docking area of the materials service center to production line delivery/process locations. Case packs of parts are loaded on carts that are then joined to a tugger. A tugger driver then takes the parts to specified delivery/process locations.

Each delivery BOM according to the present invention defines a relationship between a trailer loaded with case packs of parts, a delivery process code, and a tugger for delivering the case packs of parts to production line deliver/process locations. Each trailer may have multiple case packs assigned to different delivery process codes. The delivery process code ties at least one of the case packs on the trailer to the tugger and is associated with one or more assembly processes and related delivery/process locations. Each delivery process code is assigned to an associate that coordinates case pack and tugger staging within the materials service center.

After an associate defines trailer codes, delivery process codes, and tugger codes, case pack codes are assigned to the delivery process codes. The case pack code then ties the part data to the delivery process code, trailer code, and tugger code and facilitates delivery of the case packs of parts according assembly processes. Each tugger may follow pre-defined routes between the materials service center and production line based on the assembly processes that it supports. Groups of assembly processes or even individual assembly processes are thus supported by deliveries of case packs from an assigned tugger.

BRIEF DESCRIPTION OF THE DRAWINGS

FIGS. 7-12 are sample screen shots for a delivery BOM software application according to an example embodiment.

DETAILED DESCRIPTION OF THE EXEMPLARY EMBODIMENT(S)

Figure 1:
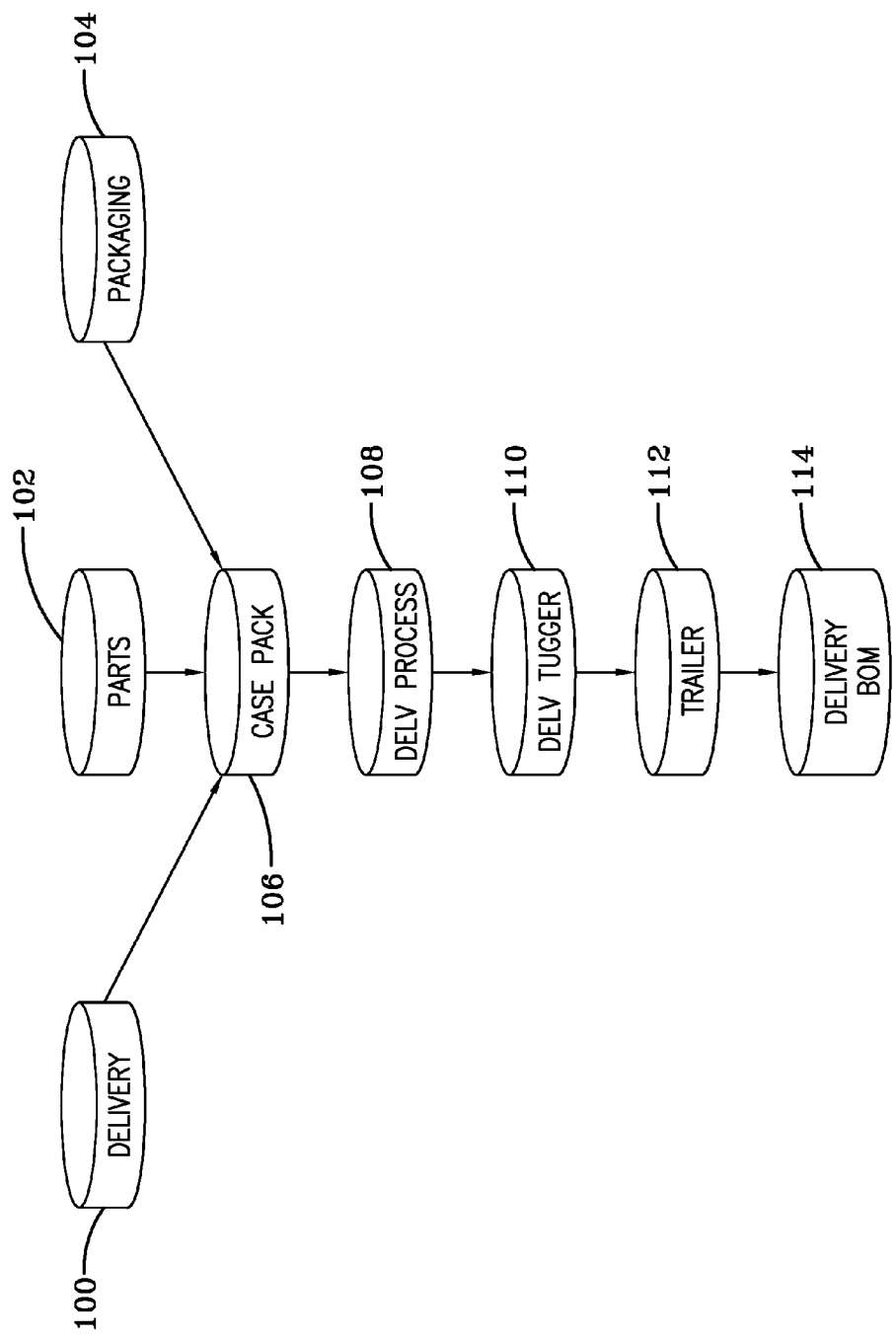
FIG. 1 is a block diagram of the data sources for a delivery BOM system and method according to an example embodiment.

In an example embodiment of the present invention for an automobile manufacturer, a production line comprises a plurality of process groups or departments where different production or assembly operations are performed (e.g., bulk, engine, welding, machining, frame assembly). Each production or assembly operation is sub-divided into a plurality of processes, each of which may be performed at a particular "process location." Case packs of parts are delivered to "delivery/process locations" that correspond to assembly processes so that the correct parts are delivered to the appropriate production line side location. The following terms are used to explain the features and functionality for an exemplary embodiment of the present invention.

TABLE 1

| Glossary | |
|---|---|
| TERM | DEFINITION |
| Process Location | Place on production line where parts are installed. Expressed as column/number location. (e.g., J201, L101, M092) |
| Install Point (Installation Point) | Point on the production line where parts are installed. This is a sequential unit location |
| Trailer Code | Represents a delivery trailer unload position in materials service center. |
| Process Engineer Associate | Associate who coordinates building of tuggers for line side delivery of parts. |
| Delivery | Process of moving parts from trailers at a dock/staging area to production line side locations. Parts are organized for delivery according to when they will be used on the production line. |
| Case Pack | A group of parts organized in varying types of containers. |
| Quad Levels | A method of sub-dividing a case pack so that packing instructions for the case pack are visually simplified. A case pack is divided into four parts (A, B, C, and D) and these quads represent horizontal areas. The case pack is also given levels (1, 2, 3, 4, etc.) that represent vertical areas. |
| Tugger | A sequence of joined carts used to carry parts to production line side locations. Typically, tuggers have seven joined carts. |
| Zone | A geographic area on the production line. These are set up to facilitate department management. |
| PAD | Process Application Delivery—delivery of parts to the exact spot line side where the parts are applied to manufactured product. |
| PSS | Parts Supply—parts shipped to manufacturing facility via the consolidation center. |

TABLE 1-continued

| Glossary | |
|---|---|
| TERM | DEFINITION |
| DSS | Direct Ship—parts shipped directly from supplier to manufacturing facility. |
| PDDA (Delivery Location Data) | Process Data Development Application—system used by manufacturing facility assembly department for operations standards. It houses the manufacturing bill of material. |
| ALS | Advanced Logistics System—system used by manufacturing facility to calculate case pack configuration. |
| PBOM | Purchasing Bill of Material—system used by manufacturing facility to retain domestic packaging specifications. |
| GPCS | Global Production Control System—system used by manufacturing facility to manage the supply chain and the source of the ordering bill of material, ship to codes, and production plan. |
| Target (Parts Data) | System used by manufacturing facility to manage the engineering bill of material. Has parts identification data. |
| Delivery Location Code | Geographic or physical locations on production line that identify where parts can be delivered. |
| Delivery Process Code | Code that represents a person who coordinates case pack and tugger staging and/or delivery. |
| Body Location | A physical place on the production line where parts are installed on the cars. |
| BOM | Bill of Material—a list of parts used to produce a completed body unit. |
| DC | Design Change Part Number—engineering form of a part number that changes each time any change is made to the part. |
| MBPN | Manufacturer Base Part Number—a form of part number used in communication with suppliers. This part number changes for minor changes to a part design. |
| BPN | Basic Part Number—a form of part number that changes when a major change occurs to a part number. This is used as a root part number for tracking purposes. |
| Delivery Associate | Associate who drives tugger with case packs attached and delivers parts to production line. |
| Delivery Administrator | Associate who sets up all the parameter codes necessary to operate the delivery system. |
| BOM Associate | Associate who maintains all delivery data for an assigned line and production type (MP or NM). |
| Dock Associate | Associate who is responsible for staging parts for delivery to production line side. |
| Container | A physical bin that houses parts as they are transported from suppliers to production line side. |
| Packaging | Codes and dimensions used to describe the type of package in which parts are transported from a materials service center to production line side. |
| Bulk Parts | High package quantity parts. These parts are typically delivered to a zone area, not line side. |

Referring to FIG. 1, a block diagram of the data sources for a delivery BOM system and method according to an example embodiment is shown. A delivery data source 100 has delivery/process location data from a manufacturing operation standards system (PDDA). The delivery/process location data may be defined according to a plurality of codes that that identify geographic or physical locations along the production or assembly line in a manufacturing facility. The location codes identify areas where parts or supplies are to be delivered for use in the various assembly or installation processes that are performed in different departments on the production line. When ordering parts from suppliers, the manufacturer may have the supplier use special containers for delivering the parts. Each container may further have a location code on it that identifies a specific location where it is delivered and used during production.

A parts data source 102 has parts data used in generating an engineering bill of material. Each part may have a number, name, quantity application, supplier information, and effective date. A packaging data source 104 has package or container code and dimension data that indicates a package or container type for transporting the parts from a supplier to a consolidation center or similar facility. Parts may then be staged and transported from the consolidation center to the materials service center and finally, to a production line location using the same package or container in which the parts were shipped from the supplier. This information may be used by one or more process engineers to build case packs of containers. The case packs of containers are used to stage and transport parts from a consolidation center or similar facility, through a materials service center or warehouse, to specific production line locations. Case packs are ordered for delivery to the materials service center according to the order in which parts will be used during the assembly or installation process. Case packs are assigned to delivery process codes to facilitate their delivery to specific delivery/process locations on the production line.

Figure 2:
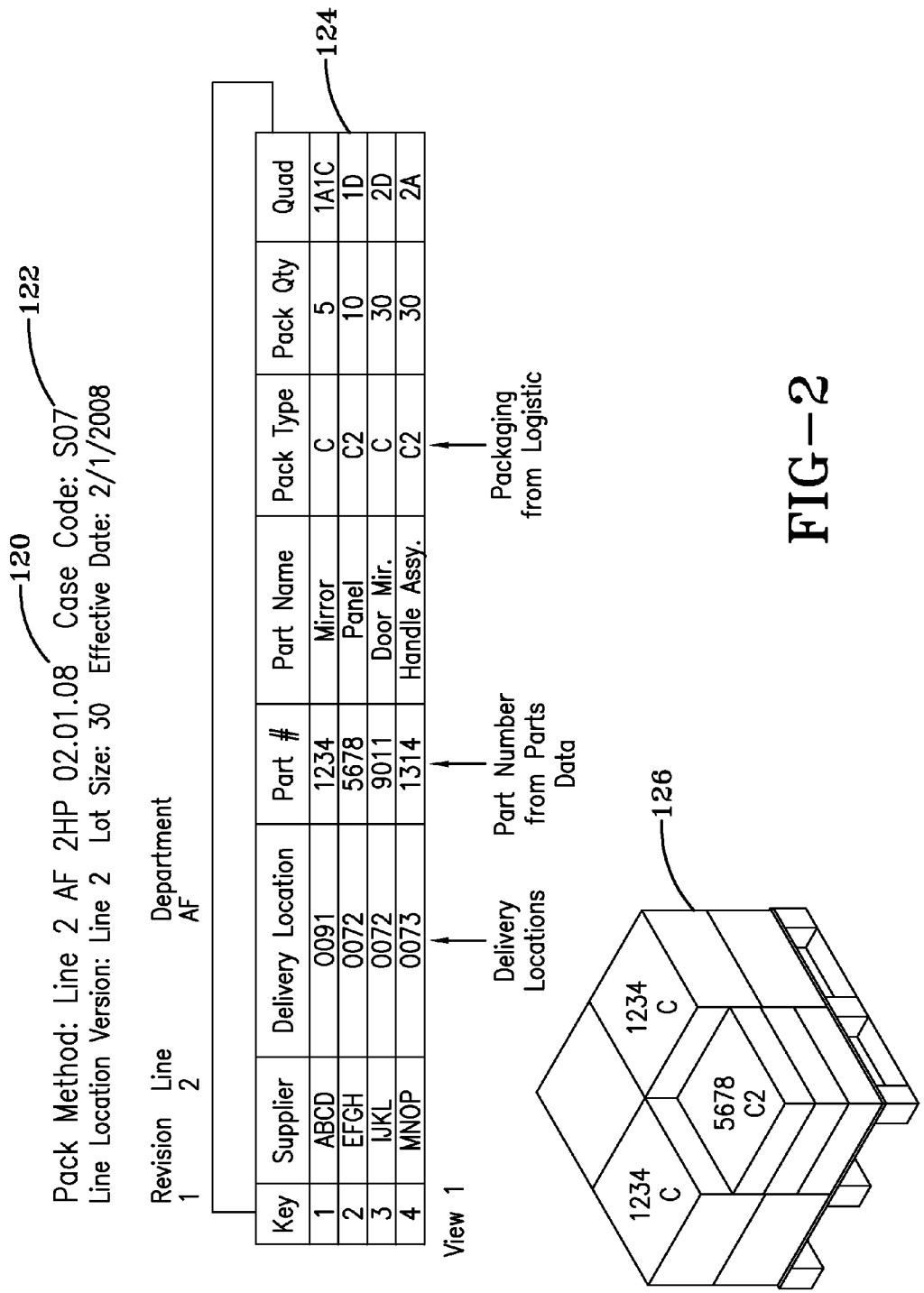
FIG. 2 is a diagram illustrating case pack details according to an example embodiment.

Referring to FIG. 2, a diagram illustrating case pack details according to an example embodiment is shown. Pack methods are defined for each production line delivery/process location and have identifying information associated with them (e.g., production line 2, frame assembly, product type 120). A case pack code 122 identifies the case pack according to its location in the materials service center. In the example, "S" refers to "south trailer," "O" refers to an aisle in the materials service center, and "7" refers to a generic case identifier. The case pack data includes a list of the parts in the case pack 124. For each part in the case pack, the case pack data includes supplier information, a delivery/process location, a part number and name, a pack or container type for the part, a pack quantity, and a location within the case pack 124.

Quadrant and level data is provided to facilitate packing and locating parts in the case packs 126. Case packs are sub-divided into quadrants and levels so that packing instructions for the case pack are visually simplified. For example, a case pack may be divided into four parts (A, B, C, and D) or quadrants that represent horizontal areas. The case pack is also divided into levels (1, 2, 3, 4, etc.) that represent vertical areas. In the example 126, containers for part number 1234 are located in quadrants 1A and 1C of the case pack. Part number 1234 may be used in different assembly process locations and therefore, loaded in different containers for delivery to different production line locations.

Referring again to FIG. 1, delivery process codes 108 and tugger codes 110 are defined so that tuggers can be assigned to delivery processes. Tuggers are used to transport case packs to the different delivery/process locations on the production line. Each tugger and driver is assigned to one or more delivery processes, each of which may correspond to one or more assembly or installation processes performed at different stations on multiple aisles of the production line. For each trip to the production line, a tugger typically takes seven carts, each loaded with a case pack. The associate assigned to the tugger delivers the case packs and then returns to take another seven case packs to production line locations. The associate makes deliveries throughout the production period to the delivery/process locations for the assigned delivery processes. The driver may follow a specific route from the materials service center to the production line locations and back to the materials service center in order to support the assigned assembly processes.

An example of multiple case packs sorted for an assigned a tugger is shown in Table 2. The tugger number is 33 and the delivery process code assigned to the tugger is AS33.

TABLE 2

Case Pack Sorting

| Process Cart | AS33 Case pack | Delivery Location | Tugger Pack Type | 33 Cart Type |
|---|---|---|---|---|
| 1 | SO7 | — | AP S | F2 |
| 2 | SO8 | — | AP NS | F2 |
| 3 | SO4/SO5 | O082 | F3 | F1.5 |
| 4 | | | | |
| 5 | | | | |
| 6 | | | | |
| 7 | | | | |

Each case pack may have an associated pack type that indicates what type of packaging or container has been used to ship the parts. In addition, the carts that comprise a single tugger may be of varying types to accommodate the different case pack types that are supported. The cart type indicates to an associate what type of equipment (e.g., forklift) may be needed to load a particular case pack on a cart.

Figure 3:
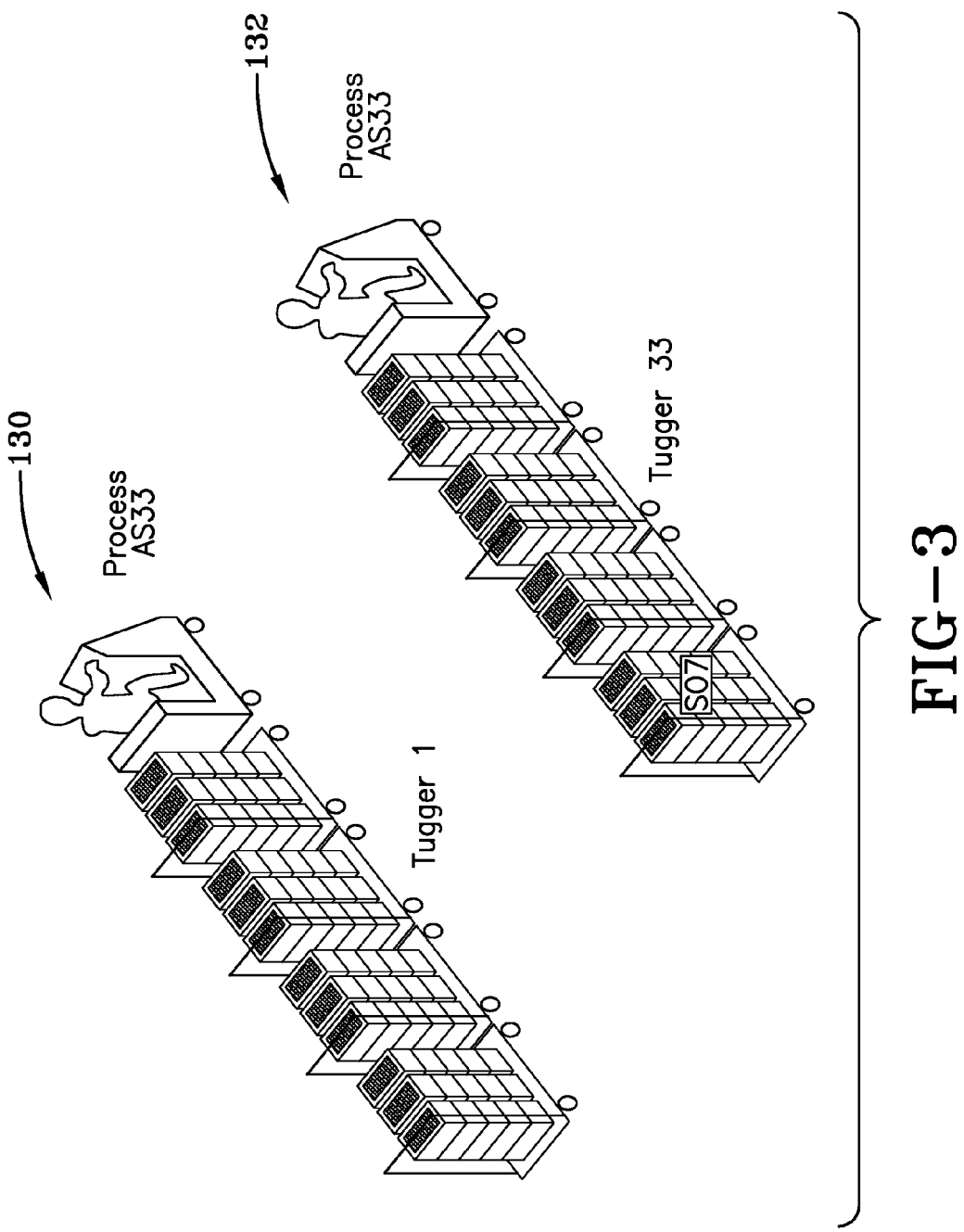
FIG. 3 is a diagram illustrating the use of tuggers to deliver case packs to production line delivery/process locations according to an example embodiment.

Referring to FIG. 3, a diagram illustrating the use of tuggers to deliver case packs to production line delivery/process locations according to an example embodiment is shown. Tuggers 130, 132 are configured throughout the production period to deliver case packs of parts to locations on the production line. As shown in FIG. 3, an associate assigned to delivery process AS33 takes the second tugger (#33) 132 to deliver case pack SO7 134 to a specified production line delivery location.

Figure 4:
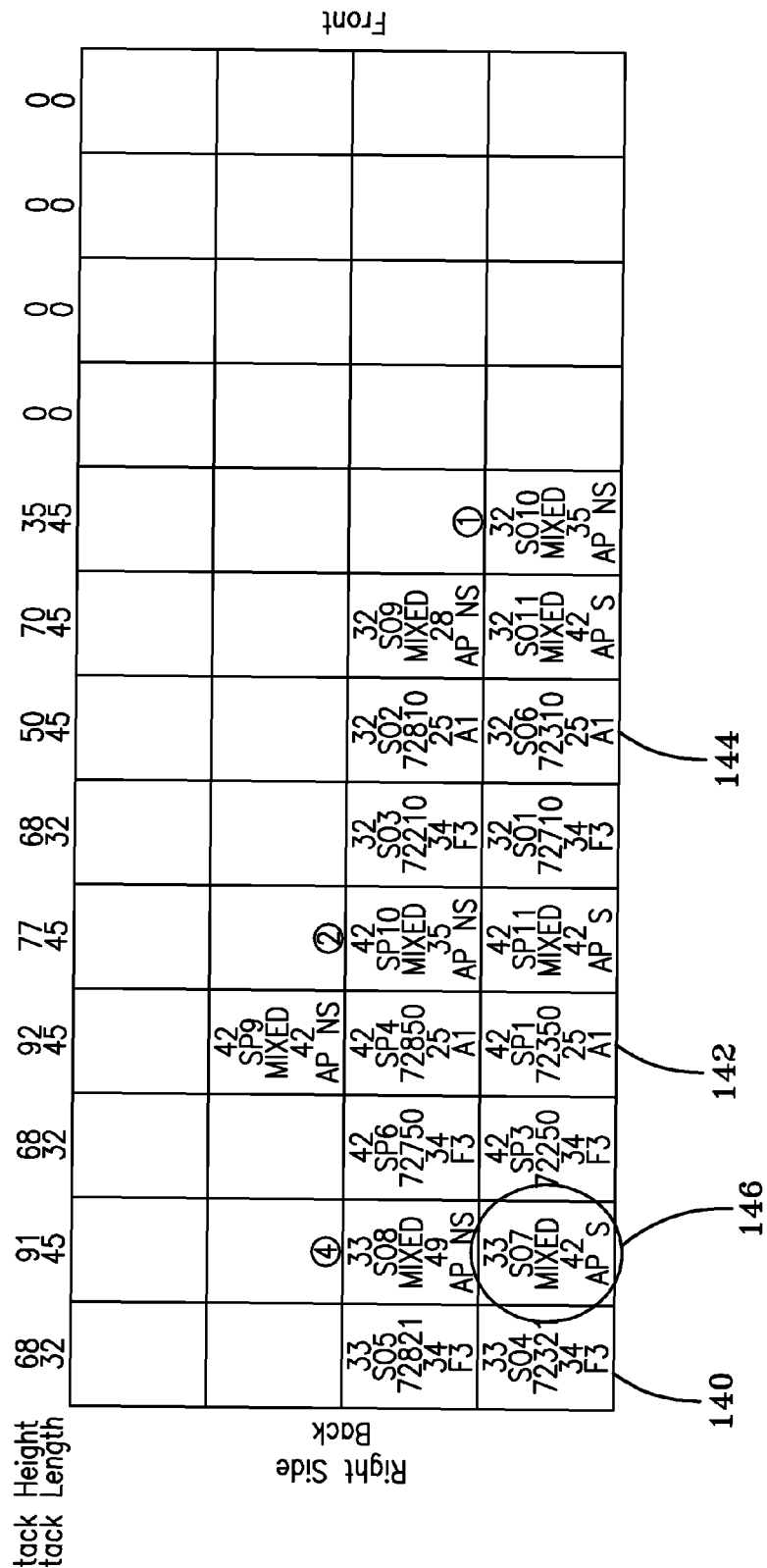
FIG. 4 is a trailer layout according to an example embodiment.

Referring again to FIG. 1, case packs are assigned to a trailer 112 and sequenced within the trailer according to the order in which they will be unloaded from the trailer, loaded on to carts, and delivered by tuggers to production line delivery locations. Referring to FIG. 4, a trailer layout according to an example embodiment is shown. The trailer is sub-divided into a plurality of areas were the parts case packs are loaded. Each defined area has a height and length. For each area, the case pack to be loaded in the area is identified. Case packs are grouped in the trailer according to delivery process codes (e.g., 33 140, 42 142, 32 144) on the production line. Case packs are unloaded from the trailer in the opposite order from which they are loaded (i.e., last in, first out). As shown in FIG. 4, case pack SO7 146 is loaded in the trailer area 140 associated with delivery process code 33.

Figure 5:
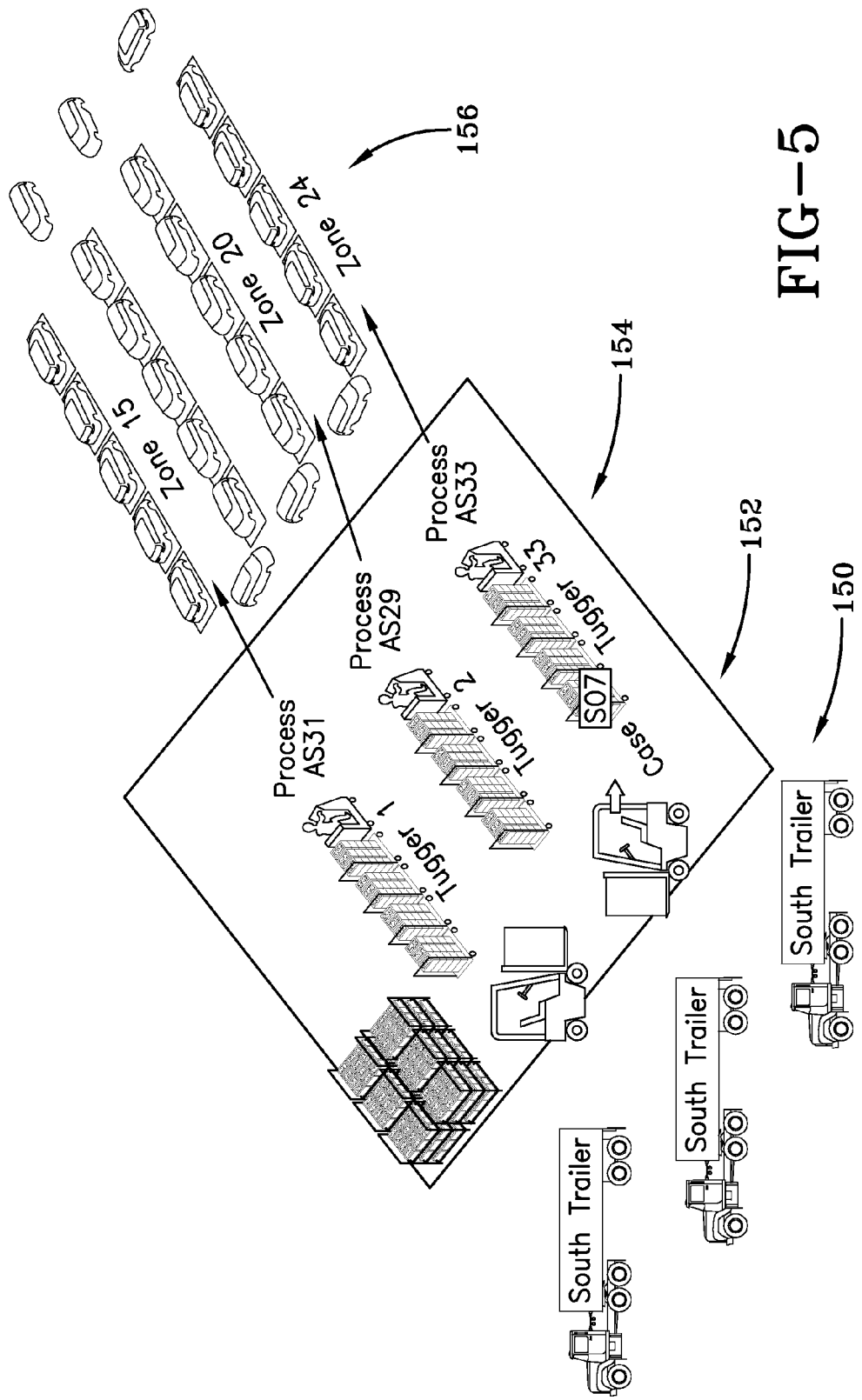
FIG. 5 is a sample floor configuration for an example embodiment.

Referring to FIG. 5, a sample floor configuration for an example embodiment is shown. Trailers containing case packs of parts 150 are parked at the loading dock of a materials service center 152 that receives the case packs of parts and delivers them to delivery locations along the production line 154. Case packs are unloaded from trailers 150 and placed on carts that are connected to a tugger 152. Each tugger is associated with one or more delivery process codes 154 (AS31, AS29, AS33) on the production line 156. Case packs are associated with delivery process codes to facilitate transporting them from the trailer to the production line and therefore, are delivered to the appropriate delivery/process locations.

Referring again to FIG. 1, the delivery location data 100, parts data 102, packaging data 104, case pack data 106, delivery process data 108, tugger data 110, and trailer data 112 are entered on a spreadsheet and provided to a BOM associate that enters the data in a delivery management system to generate delivery BOMs for the products manufactured on the production line.

Referring to Table 3, data from process engineering is used to populate fields in a delivery management system database. The process engineering data relates to a number of different assembly and installation processes that are performed by associates on a production line. Assembly and installation process data may be organized according to department. For example, the sample data in Table 4 applies to frame assembly processes that may be performed on an automotive production line. The following data fields are present in the table.

TABLE 3

Table 4 Fields

| Field | Description |
| --- | --- |
| Process Group (Department) | Process Group for part data |
| Type | Identifier for type or model of manufactured product |
| Part Number | Identifier for parts in case pack |
| Process | Identifier for assembly process on production line |
| Quantity Per Process | Number of parts required at process for production |
| Container Length | Container dimension (Not shown) |
| Container Width | Container dimension (Not shown) |
| Container Height | Container dimension (Not shown) |
| Container Quantity | Number of parts in container |
| Container Type | Pack or container type |
| Ship to | Location where parts are received (e.g., consolidation center) |
| Process Location | Identifier for process location on production line. |
| Tugger | Identifier for tugger for transporting case packs to delivery locations on production line. |
| Trailer Code | Identifier for trailer location (e.g., line 2, south, aisle O, number 3) |
| Case pack | Identifier for case pack. |

TABLE 4

| Dept. | Type | Part No. | Proc. | Qty | Cont Qty | Cont Type | Ship To | Proc | Tugger | Trailer | Case pack |
| --- | --- | --- | --- | --- | --- | --- | --- | --- | --- | --- | --- |
| AF | X1A | 112233AA | O134 | 1 | 120 | A1 | PSS | AS33 | 32 | 2S03 | S07 |
| AF | X2A | 112233AA | O134 | 1 | 120 | A1 | PSS | AS33 | 32 | 2S03 | S07 |
| AF | X3A | 112233AA | O134 | 1 | 120 | A1 | PSS | AS33 | 32 | 2S03 | S07 |
| AF | X1B | 112233AA | O134 | 1 | 120 | A1 | PSS | AS33 | 32 | 2S03 | S07 |
| AF | X2B | 112233AA | O134 | 1 | 120 | A1 | PSS | AS33 | 32 | 2S03 | S07 |
| AF | X2B | 112233AA | O134 | 1 | 120 | A1 | PSS | AS33 | 32 | 2S03 | S07 |
| AF | X1C | 112233AA | O134 | 1 | 120 | A1 | PSS | AS33 | 32 | 2S03 | S07 |
| AF | X2C | 112233AA | O134 | 1 | 120 | A1 | PSS | AS33 | 32 | 2S03 | S07 |
| AF | X3C | 112233AA | O134 | 1 | 120 | A1 | PSS | AS33 | 32 | 2S03 | S07 |
| AF | X1D | 112233AA | O134 | 1 | 120 | A1 | PSS | AS33 | 32 | 2S03 | S07 |
| AF | X2D | 112233AA | O134 | 1 | 120 | A1 | PSS | AS33 | 32 | 2S03 | S07 |
| AF | X3D | 112233AA | O134 | 1 | 120 | A1 | PSS | AS33 | 32 | 2S03 | S07 |
| AF | X4D | 112233AA | O134 | 1 | 120 | A1 | PSS | AS33 | 32 | 2S03 | S07 |

Each delivery BOM according to the present invention is assigned a plan code (delivery BOM identifier) that distinguishes between the types of products that are manufactured on the production line. For the automotive example described herein, the delivery BOM plan code or identifier distinguishes between automobile model types and model years and therefore, allows associates to define multiple delivery scenarios depending upon the type of product to be produced. The delivery BOM aligns with the manufacturing BOM so the appropriate parts are delivered line side. The delivery BOM facilitates the routing and delivery of parts according to production needs.

The plan code or identifier may comprise additional information such as company code, line number, year, quantity, and demand type. Delivery BOMs may be generated for each department on the production line. The delivery BOM, therefore, facilitates delivery of the appropriate parts (which vary according to model and year) to the appropriate locations on the production line. FIGS. 7-12 are sample screen shots for a delivery BOM software application according to an example embodiment. In an example embodiment, the delivery BOM application or module is part of a delivery management system that the manufacturer uses to manage various aspects of parts delivery to the production line. An associate interacts with the delivery BOM application or module to generate delivery BOMs for the different automobile models and years.

Figure 6:
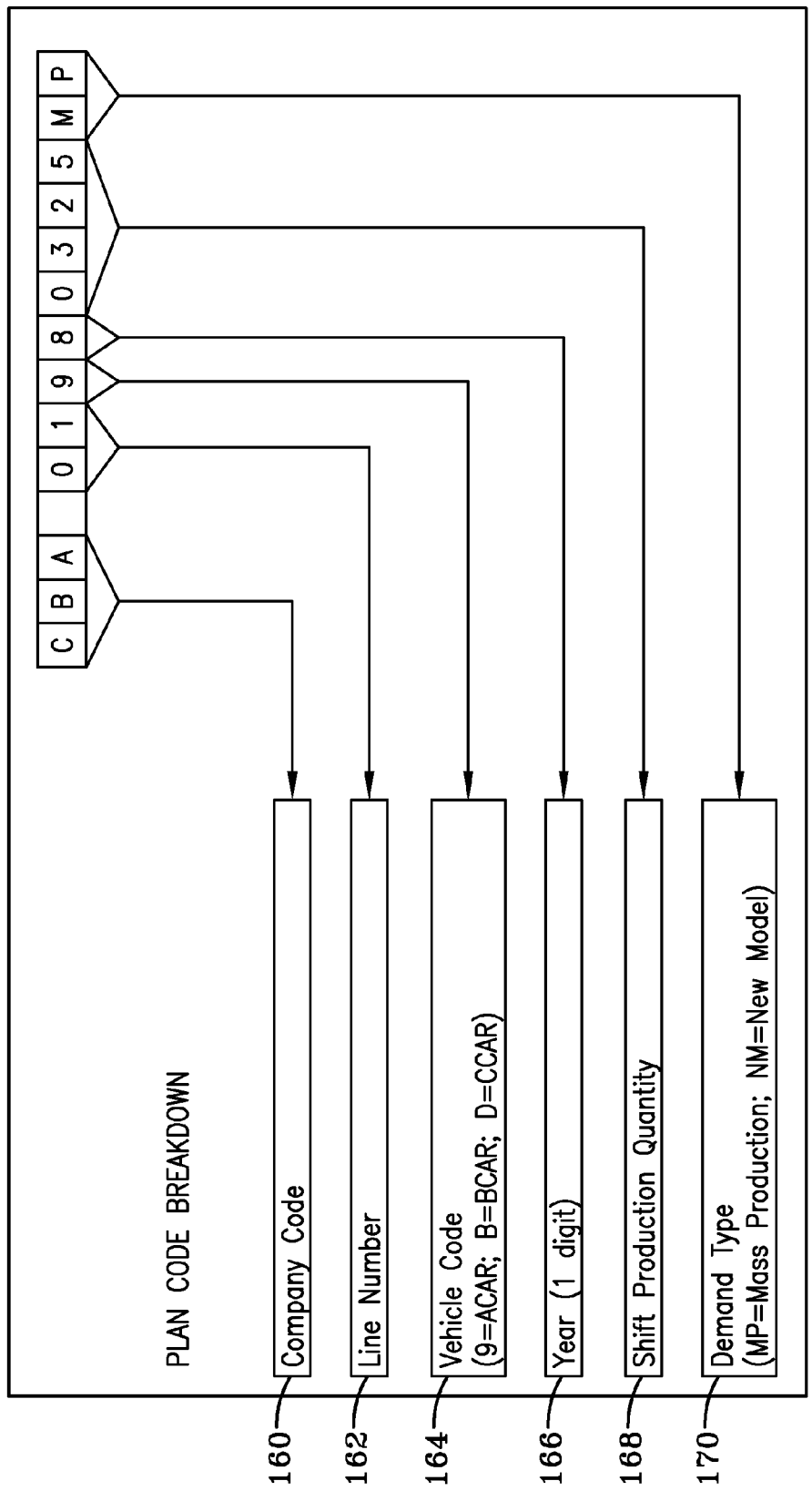
FIG. 6 is a sample plan code according to an example embodiment.

Referring to FIG. 6, a sample plan code according to an example embodiment is shown. A plan code or identifier may comprise the following information: company code 160; line number 162 indicating a particular production line in the manufacturing facility; vehicle 164 indicating the product with which the delivery BOM is associated; a model year 166; a production quantity 168; and a demand type 170 (mass production (MP) or new model (NM)).

Figure 7:
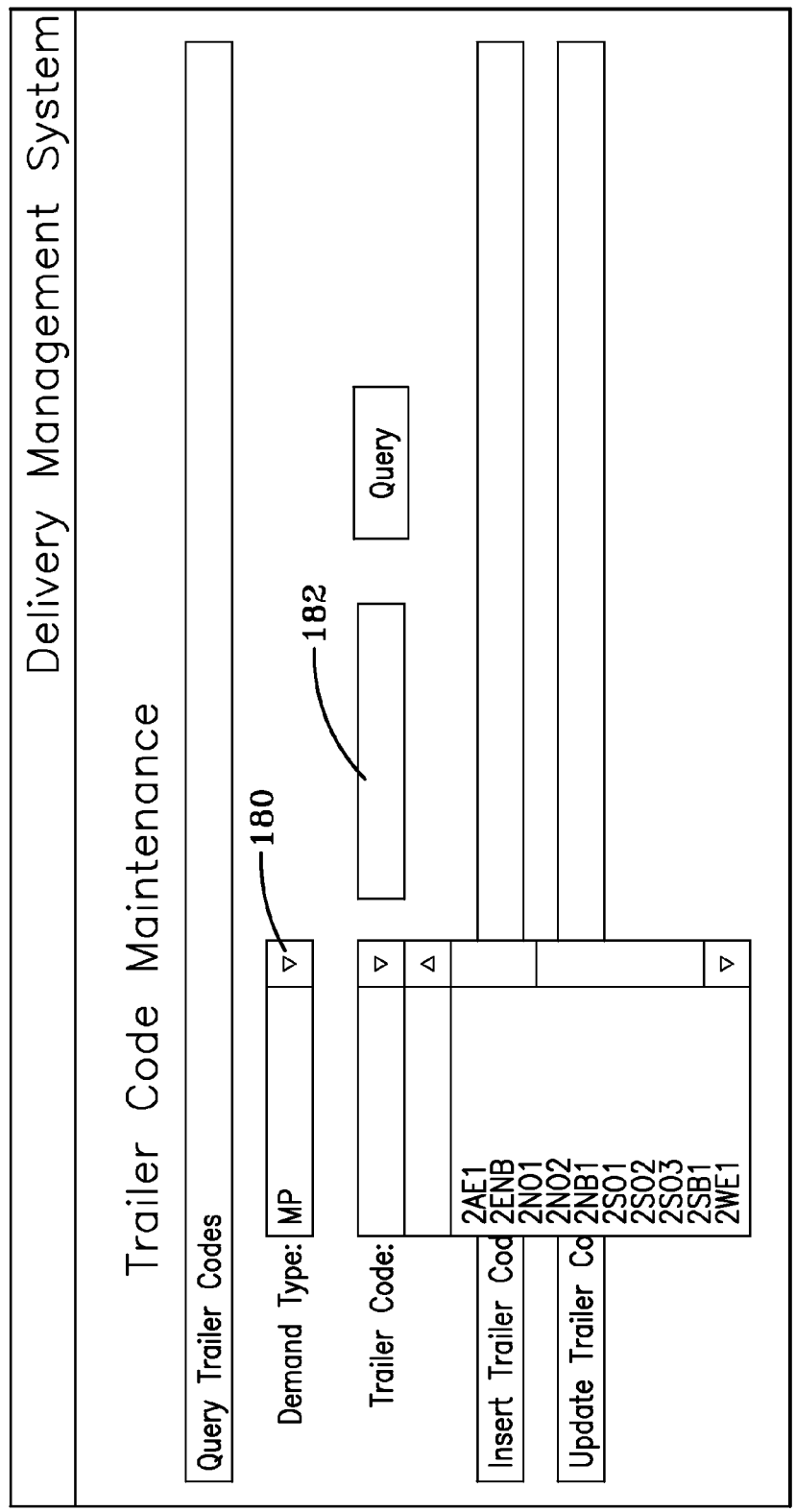

Referring to FIG. 7, a trailer code maintenance screen according to an example embodiment is shown. Each trailer is assigned a code that indicates an unload position at the materials service center. Case packs are unloaded from trailers using forklifts or other means, stored in an unload position at the center, placed on carts, and then delivered by tugger to production line locations. At this screen, an associate enters trailer code data or modifies existing trailer code data. Initially, the associate identifies a demand type 180 for the product. In the automotive example herein, the type may be mass production (MP) or new model (NM). The trailer codes that the associate enters or modifies provide information about the unload position for the trailer 182. For example, 2N02 refers to production line 2, north docks, and trailer 02. Trailer codes may be modified as the manufacturer determines the need to add trailers (e.g., because a line is added).

Figure 8:
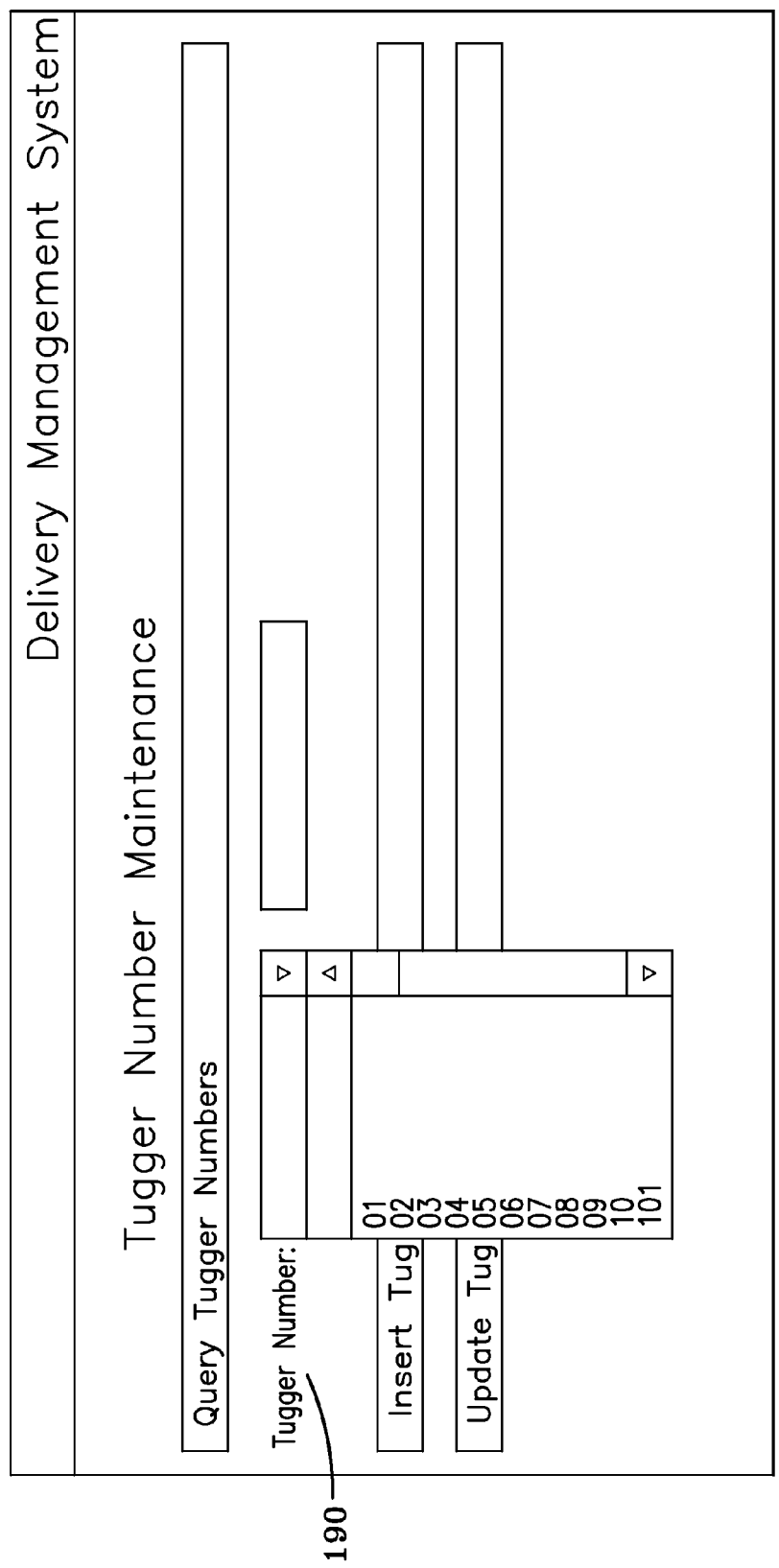

Referring to FIG. 8, a tugger number maintenance screen according to an example embodiment is shown. The associate may add or delete tuggers 190 as needed to accommodate the production needs. In an example embodiment, one associate is assigned to a tugger and one or more delivery processes and is responsible for delivery of case packs to his or her assigned delivery processes.

Figure 9:
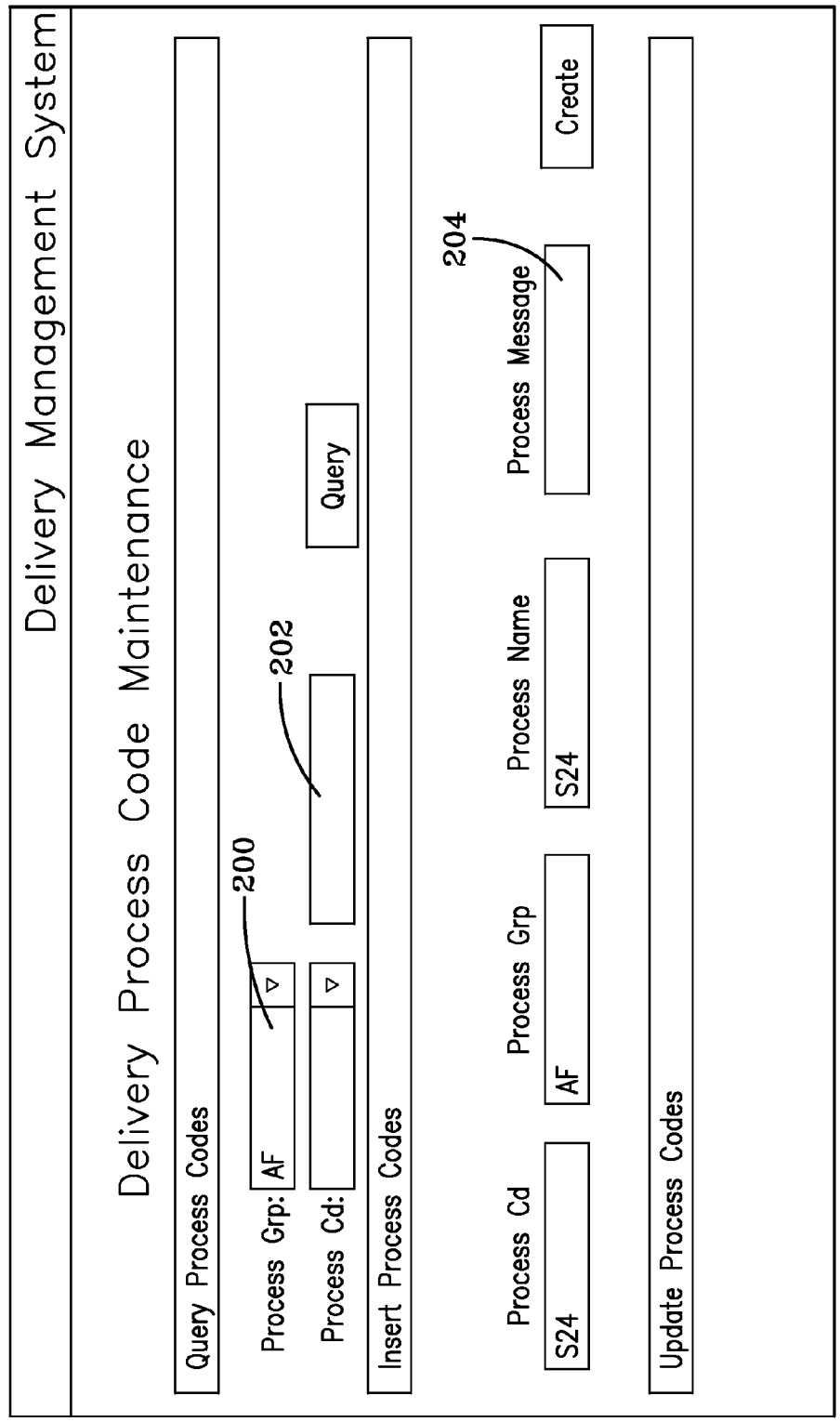

Referring to FIG. 9, a delivery process code maintenance screen according to an example embodiment is shown. A delivery process code identifies an associate who is responsible for case pack and tugger staging for associated assembly or installation processes on the production line. The associate coordinates the various activities and tasks that are performed to stage case packs and tuggers for delivering parts to specified delivery locations on the production line. The production line may be sub-divided into departments or process groups 200 and delivery/process locations are defined for the various assembly or installation processes that occur within the department or process group 202. The associate can also define new delivery process codes as production needs change. When a delivery process code is defined, it is assigned a numeric code and associated with a process group or department 204. It may also be assigned a name and an optional message.

Referring to FIG. 10, a process development maintenance screen according to an example embodiment is shown. The associate uses the process development maintenance screen to maintain delivery process codes for specified plans and departments. Using this screen, the associate defines the relationship between delivery processes, trailers, and tuggers for each plan code. Initially, the associate selects a plan code and line number to identify the delivery BOM 210. Next, the associate specifies a department for the delivery BOM 212. A trailer code 214, delivery process code 216, and tugger code 218 are then assigned. The associate also has the option of creating a new delivery process code for the selected plan and department 220. The associated plan code, department, trailer code, delivery process code, and tugger code identifies to associates details regarding the routing and transportation of case packs to the production line.

Referring to FIG. 11, a case code maintenance screen according to an example embodiment is shown. Using the case code maintenance screen, an associate can assign a case pack code 230 to an associated plan code/department/model and delivery process code 232 (with associated trailer code, delivery process code, and tugger code). The details of the delivery process code are also displayed 234. The associate also has the option of creating new case codes 236. The associate uses the case code maintenance features and functionality to assign multiple case codes to a delivery process code.

Referring to FIG. 12, a process code maintenance screen according to an example embodiment is shown. The process code maintenance features and functionality allow the associate to assign delivery details to part numbers. When the associate enters the case pack code 240 for the part 242, the delivery process code, trailer code, and tugger code data is assigned as well. The associate also has the options of inserting and updating process code data from the screen. The associate selects a part number and then enters a case pack code 244 for the specified part number, zone, delivery/process location, quantity, delivery mode, body location, and quadrant level for the case pack.

Figure 13:
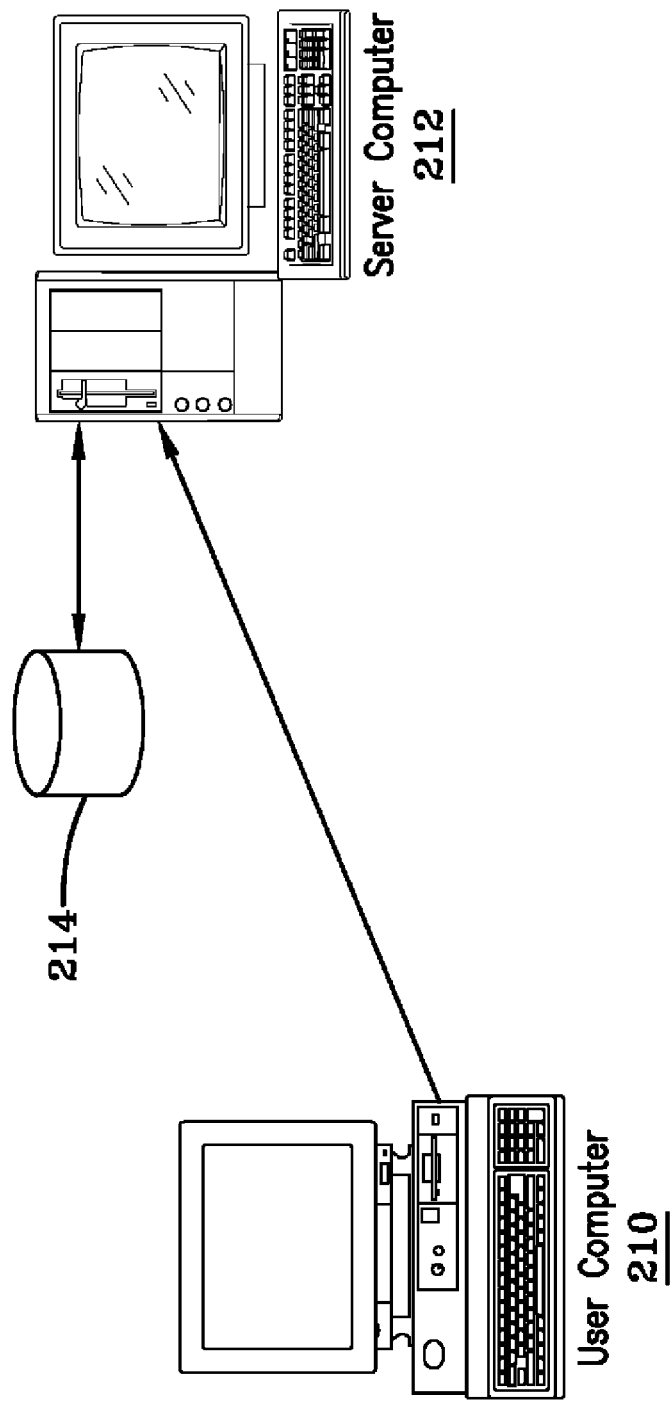
FIG. 13 is a block diagram of computerized components for a delivery BOM system and method according to an example embodiment.

Referring to FIG. 13, a block diagram of computerized components for a delivery BOM system and method according to an example embodiment is shown. In an example embodiment, data from various sources as described previously may be accessible to a server computer 214. A user computer 210 connects to the server computer 212 and one or more applications operating at the server computer support the features and functionality for generating a delivery BOM. A computer user interacts with the computer as described in association with FIGS. 9-12 to generate one or more delivery BOMs for different products manufactured on the production line.

The plan codes and delivery process codes of the present invention allow an associate to define a delivery BOM or "roadmap" for delivering parts to a production line for each of the different types of products that are manufactured at the facility. Data for each delivery BOM may be saved and used in another delivery BOM for a different product. In many instances, the number of parts that two different products have in common may be substantial. It is important, however, that the delivery BOM reflect the differences between the products so that the appropriate parts are delivered to the correct production line locations at the appropriate time. The computerized system and method of generating a delivery BOM allows a computer user to quickly and easily generate the needed documents.

Although the present invention has been specifically explained with respect to certain exemplary embodiments in which a delivery BOM for an automotive production line is shown and described, it should be understood by one skilled in the art that a system and method of the present invention can be used in any type of manufacturing facility. Delivery codes, process data, and other aspects of the data relationships may be defined and organized in various ways and still fall within the scope of the claims.

From the foregoing description, it can be understood that there are various ways to construct a delivery BOM while still falling within the scope of the present invention. As such, while certain embodiments of the present invention are described in detail above, the scope of the invention is not to be considered limited by such disclosure, and modifications are possible without departing from the spirit of the invention as evidenced by the following claims:

What is claimed is:

1. A computerized system for generating a delivery bill of materials for delivering parts to locations on a production line comprising:
    (a) a server computer in communication with a database for storing:
        (1) case pack code data associated with each of a plurality of containers comprising:
            (A) parts for use in an assembly process on said production line; and
            (B) production line location data for delivering said containers to a production line location;
        (2) an identifier for said delivery bill of materials wherein said identifier identifies a product associated with said delivery bill of materials;
        (3) a plurality of trailer codes wherein each code defines a position in a materials service center for unloading a case pack;
        (4) a plurality of delivery process codes wherein each code is associated with at least one assembly process performed on said production line;
        (5) a plurality of tugger codes wherein each code defines a tugger for transporting said case packs;
    (b) a user computer for accessing said server computer to:
        (1) associate with said delivery bill of materials identifier a trailer code, a delivery process code, and a tugger code;
        (2) associate with said delivery bill of materials identifier a plurality of case pack codes; and
        (3) generate a delivery bill of materials for said identifier, said delivery bill of materials comprising:
            (A) said delivery process code, said trailer code, said tugger code, and said case pack codes; and
            (B) said production line locations for said case pack codes wherein said production line locations are added to said delivery bill of materials when said case pack codes are associated with said identifier for said delivery bill of material.

2. The system of claim 1 wherein each case pack code is associated with a plurality of different types of containers for delivering said parts to said production line location.

3. The system of claim 1 wherein said case packs are loaded on carts for delivery to said production line locations.

4. The system of claim 3 said plurality of carts are joined to said tugger for transporting said case packs to production line locations.

5. The system of claim 1 wherein said trailer codes identify a location at a docking area of a materials service center.

6. The system of claim 1 wherein said case packs are organized on a trailer according to said delivery process codes.

7. The system of claim 1 wherein said identifier further identifies a model for said product associated with said delivery bill of materials.

8. A computerized method for generating a delivery bill of materials for delivering parts to locations on a production line comprising:
   (a) receiving at a computer:
      (1) a case pack code for each of a plurality of containers comprising:
         (A) parts for use in an assembly process on said production line; and
         (B) production line location data for delivering said containers to a production line location;
      (2) a plurality of trailer codes wherein each code defines a position in a materials service center for unloading a case pack;
      (3) a plurality of tugger codes wherein each code defines a tugger for transporting a case pack;
      (4) a plurality of delivery process codes wherein each code is associated with at least one assembly process performed on said production line;
   (b) entering at said computer an identifier for said delivery bill of materials wherein said identifier identifies a product associated with said delivery bill of materials;
   (c) associating at said computer with said delivery bill of materials identifier at least one trailer code, at least one delivery process code, and at least one tugger code;
   (c) associating at said computer with said delivery bill of materials identifier a plurality of case pack codes; and
   (d) generating at said computer a delivery bill of materials for said identifier, said delivery bill of materials comprising:
      (1) said at least one delivery process code, said at least one trailer code, said at least one tugger code, and said case pack codes; and
      (2) said production line locations for said case pack codes wherein said production line locations are added to said delivery bill of material when said case pack codes are associated with said identifier for said delivery bill of material.

9. The method of claim 8 wherein each case pack code is associated with a plurality of different types of containers for delivering said parts to said production line location.

10. The method of claim 8 wherein said case packs are loaded on carts for delivery to said production line locations.

11. The method of claim 10 said plurality of carts are joined to said tugger for transporting said case packs to production line locations.

12. The method of claim 8 wherein said trailer codes identify a location at a docking area of a materials service center.

13. The method of claim 8 wherein said case packs are organized on a trailer according to said delivery process codes.

14. The method of claim 8 wherein said identifier further identifies a model for said product associated with said delivery bill of materials.

15. A computerized method for generating a delivery bill of materials for delivering parts to locations on a production line comprising:
   (a) associating at a computer a case pack code with each of a plurality of containers comprising:
      (1) parts for use in an assembly process on said production line; and
      (2) production line location data for delivering said containers to a production line location;
   (b) defining at said computer an identifier for said delivery bill of materials wherein said identifier identifies a product associated with said delivery bill of materials;
   (c) defining at said computer a plurality of trailer codes wherein each code defines a position in a materials service center for unloading a case pack;
   (d) defining at said computer a plurality of delivery process codes wherein each code is associated with at least one assembly process performed on said production line;
   (e) defining at said computer a plurality of tugger codes wherein each code defines a tugger for transporting said case packs;
   (f) associating at said computer with said delivery bill of materials identifier a trailer code, a delivery process code, and a tugger code;
   (g) associating at said computer with said delivery bill of materials identifier a plurality of case pack codes; and
   (h) generating at said computer a delivery bill of materials for said identifier, said delivery bill of materials comprising:
      (1) said delivery process code, said trailer code, said tugger code, and said case pack codes; and
      (2) said production line locations for said case pack codes wherein said production line locations are added to said delivery bill of material when said case pack codes are associated with said identifier for said delivery bill of material.

16. The method of claim 15 wherein each case pack code is associated with a plurality of different types of containers for delivering said parts to said production line location.

17. The method of claim 15 wherein said case packs are loaded on carts for delivery to said production line locations.

18. The method of claim 17 said plurality of carts are joined to said tugger for transporting said case packs to production line locations.

19. The method of claim 15 wherein said trailer codes identify a location at a docking area of a materials service center.

20. The method of claim 15 wherein said case packs are organized on a trailer according to said delivery process codes.

* * * * *